Patented Feb. 3, 1948

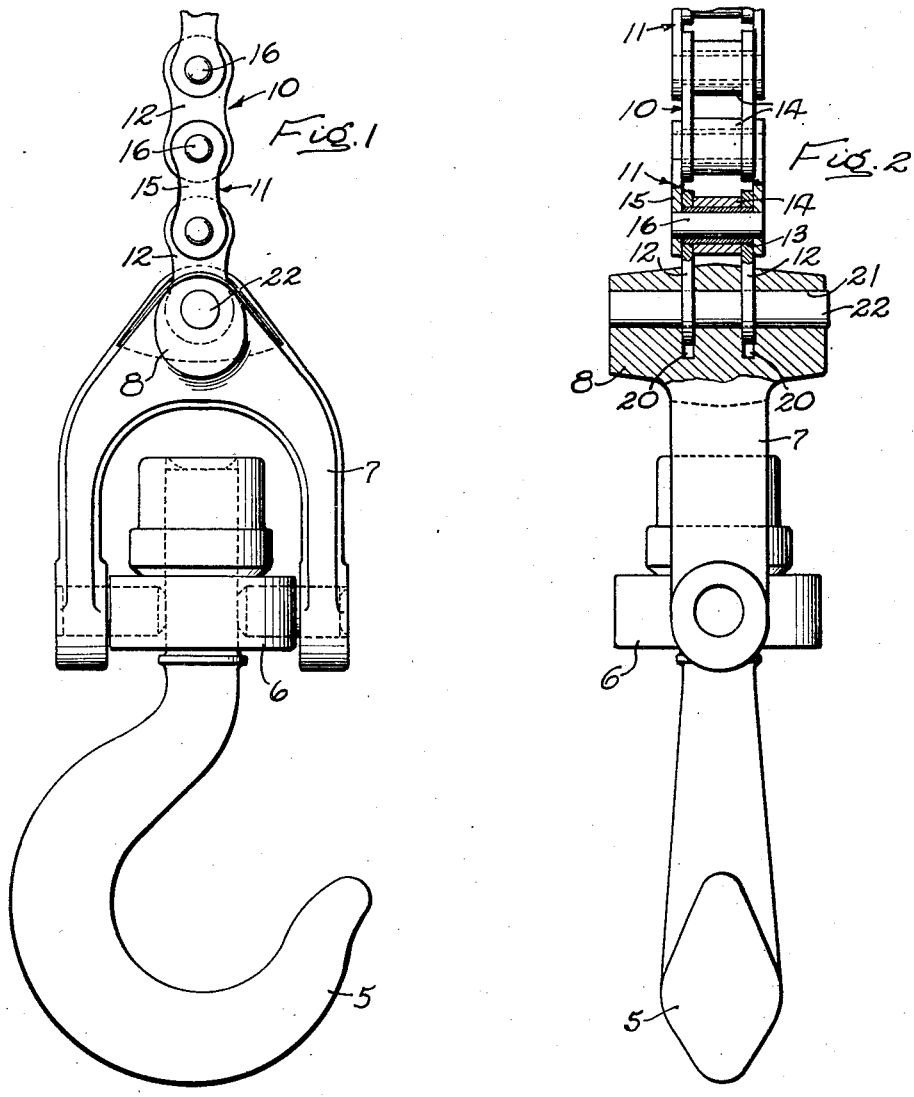

2,435,328

UNITED STATES PATENT OFFICE 2,435,328

CHAIN CONNECTION

Ralph E. Smith, Muskegon, Mich., assignor to Manning, Maxwell & Moore, Inc., Muskegon, Mich., a corporation of New Jersey Application December 22, 1945, Serial No. 636,558

2 Claims. (Cl. 294—1)

The invention relates to hoists of the type employing roller chains and is concerned particularly with the connection of the roller chain to the load hook.

One object of the invention is to provide an improved connection for securing a roller chain to the load hook, which is stronger and more resistant to shock than connections of the type heretofore employed.

A more specific object is to provide an improved connection for securing the roller chain to the load hook which permits the use of a larger and stronger connecting pin and which affords ample support for relieving the pin of binding stresses.

Other objects and advantages of the invention will become apparent from the following detailed description of the preferred embodiment illustrated in the accompanying drawing in which:

Figure 1 is a side elevational view of a roller chain and load hook connected in accordance with the present invention.

Fig. 2 is a front view of the chain and hook partly sectioned to show the details of the improved connection.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration the invention has been shown as employed for connecting a conventional roller chain to a load hook having a hook portion 5 of the type commonly used with small hand or power driven hoists. In the exemplary embodiment, the hook portion 5 is swivel mounted in an annular member 6 supported by trunnions in a U-shaped shackle 7. The shackle 7 is formed at its upper end with a connecting portion or head, herein shown as a transverse boss 8, for the attachment of the chain.

Roller chains of the conventional type are made up of alternatively arranged inside or roller links 10 and outside or pin links 11. Each roller link 10 comprises a pair of elongated tension members or side plates 12 secured together in spaced relation by tubular bushings 13. The bushings are secured in apertures adjacent the ends of the side plates usually by a press fit and serve as bearing for rollers 14.

The pin links 11 consist of elongated tension members or side plates 15 connected at opposite ends by pins 16 passing through the bushings 13 of the adjacent roller links. The pins may be riveted or otherwise secured to the side plates 15 and are dimensioned to permit the bushings 13 to turn freely thereon.

The usual method of fastening a roller chain to a load hook is to form the shackle of the hook with a lug of the same width as the roller link and adapted to be inserted between the side plates of a pin link which terminates the chain. The boss is drilled to receive a regular chain pin which is utilized to secure the side plates to the boss.

Theoretically, a connection of the type above described would appear to be as strong as the rest of the chain since the pin connecting the chain with the load hook has the same diameter and other characteristics as the other pins connecting the links of the chain. In practice it has been found that this is not the case, but that the strength of the connection declines rapidly under repeated applications of shock load to which such apparatus is subjected in the ordinary operations of a hoist. This is due primarily to the gradual enlargement of the ends of the pin holes in the load hook which results in a shifting of the load toward the central portion of the pin and the application thereto of bending stresses for which the pin is not adequately proportioned.

In accordance with the present invention, the chain is terminated in a roller link, from the free end of which the bushing 13 has been removed, thus leaving two alined apertures of relatively large size in the side plates 12 adjacent the free end of the terminal link. To provide for attachment of the chain thereto, the boss 8 of the load hook shackle is formed with parallel slots 20 spaced apart and dimensioned to receive the side plates 12 of the terminal roller link with a relatively sung fit. The slots 20 are preferably located equidistant from the ends of the boss so as to provide solid portions of substantial size on opposite sides of the link and between the side plates 12. Extending longitudinally through the boss 8, substantially perpendicular to the slots 20 and intersecting the same, is a bore 21 of the same diameter as the apertures in the side plates 12 from which the bushing 13 was removed. The bore is thus enabled to accommodate a pin 22 of the same diameter as the bushing 13.

To secure the chain to the load hook, the side plates 12 of the terminal roller link are inserted in the slots 20 with the bushing apertures of the plates alined with the bore 21. The pin 22 is then driven through the bore and the apertures to complete the connection. The relatively large pin 22 permitted by the improved construction materially strengthens the connection. Additional strength and durability is imparted thereto by reason of the support provided for the pin on both sides of the plates 12. Moreover, the bearings for the pin extend very close to the sides of the plates so that the pin is subjected only to shearing stresses which are much more readily resisted than bending stresses.

It will be apparent from the foregoing that the invention provides a connection of novel and advantageous character for securing a conventional roller chain to the load hook of a hoist. The improved connection permits the use of a larger connecting pin than has heretofore been practical and moreover provides better bearing support for the pin which effectually eliminates bending stresses and enables the pin to withstand repeated applications of shock loads without danger of failure.

I claim as my invention:

1. The combination with a load hook, of a roller chain having a terminal link comprising spaced parallel side plates pivotally secured at one end to the adjacent link and having alined apertures at the other end, a boss formed on said load hook, said boss having a pair of transverse slots located inwardly from the ends thereof and spaced apart to receive said side plates, a bore extending through said boss disposed substantially perpendicular to and intersecting said slots, and a pin projecting through said bore and through the apertures in said side plates, said boss providing bearings for said pin on opposite sides of each of said plates.

2. The combination with a load hook having a hook portion swivel mounted on a shackle, of a roller chain terminating in a link comprising spaced parallel side plates each pivotally secured at one end to one end of the adjacent link and having alined apertures at their other ends, said swivel having a head portion formed with a pair of slots spaced apart to receive the side plates of said terminal link, the head portion of said shackle having a bore disposed substantially perpendicular to and intersecting said slots, and a pin projecting through said bore and through the apertures in the side plates of said terminal link, said head portion of the shackle providing bearings for said pin on opposite sides of each of said plates.

RALPH E. SMITH.

REFERENCES CITED

The following references are of record in the file of this patent:

UNITED STATES PATENTS

| Number | Name | Date |
|---|---|---|
| 1,561,787 | Jones | Nov. 17, 1925 |
| 2,211,873 | Whitcomb | Aug. 20, 1940 |
| 2,335,571 | Schroeder | Nov. 30, 1943 |